(12) United States Patent
Underwood (10) Patent No.: US 7,369,609 B2
(45) Date of Patent: May 6, 2008

(54) DUTY FACTOR ENCODED DATA AND CLOCK TRANSMISSION

(75) Inventor: George D. Underwood, Inglewood, CA (US)

(73) Assignee: The Boeing Company, Chicago, IL (US)

( * ) Notice: Subject to any disclaimer, the term of this patent is extended or adjusted under 35 U.S.C. 154(b) by 886 days.

(21) Appl. No.: 10/404,571

(22) Filed: Apr. 1, 2003

(65) Prior Publication Data

US 2004/0196898 A1    Oct. 7, 2004

(51) Int. Cl.
*H03K 7/08*    (2006.01)

(52) U.S. Cl. ..................... 375/238; 375/316

(58) Field of Classification Search ............... 375/238, 375/242, 254, 316
See application file for complete search history.

(56) References Cited

U.S. PATENT DOCUMENTS

| 4,713,841 | A | * | 12/1987 | Porter et al. | ............. 398/191 |
| 5,942,977 | A | * | 8/1999 | Palmer et al. | ........... 340/572.5 |

* cited by examiner

*Primary Examiner*—Kevin Burd
(74) *Attorney, Agent, or Firm*—Gates & Cooper LLP (57) ABSTRACT

A method, apparatus, article of manufacture, and a memory structure for transcieving data and a clock on a single data stream. The method comprises the steps of receiving an encoded data stream, the encoded data stream generated by encoding a data stream by a duty factor representing a value of the data in the data stream; and decoding the encoded data stream according to the duty factor of the encoded data stream. The apparatus comprises a receiver for receiving an encoded data stream, the encoded data stream generated by encoding a data stream by a duty factor representing a value of the data in the data stream; and a decoder, communicatively coupled to the receiver, the decoder for decoding the encoded data stream according to the duty factor of the encoded data stream.

4 Claims, 7 Drawing Sheets

DUTY FACTOR ENCODED DATA AND CLOCK TRANSMISSION

BACKGROUND OF THE INVENTION

1. Field of the Invention

The present invention relates to systems and methods for transcieving data, and in particular to a system and method for transcieving data and clock information sharing a single data stream using channel coding.

2. Description of the Related Art

It is often necessary or desirable to monitor or control the performance and operating characteristics of remotely disposed systems such as aircraft, missiles, and spacecraft. Monitored information is typically transmitted by a telemetry subsystem on the monitored system to a remote location (typically, terrestrially located).

Figure 1:
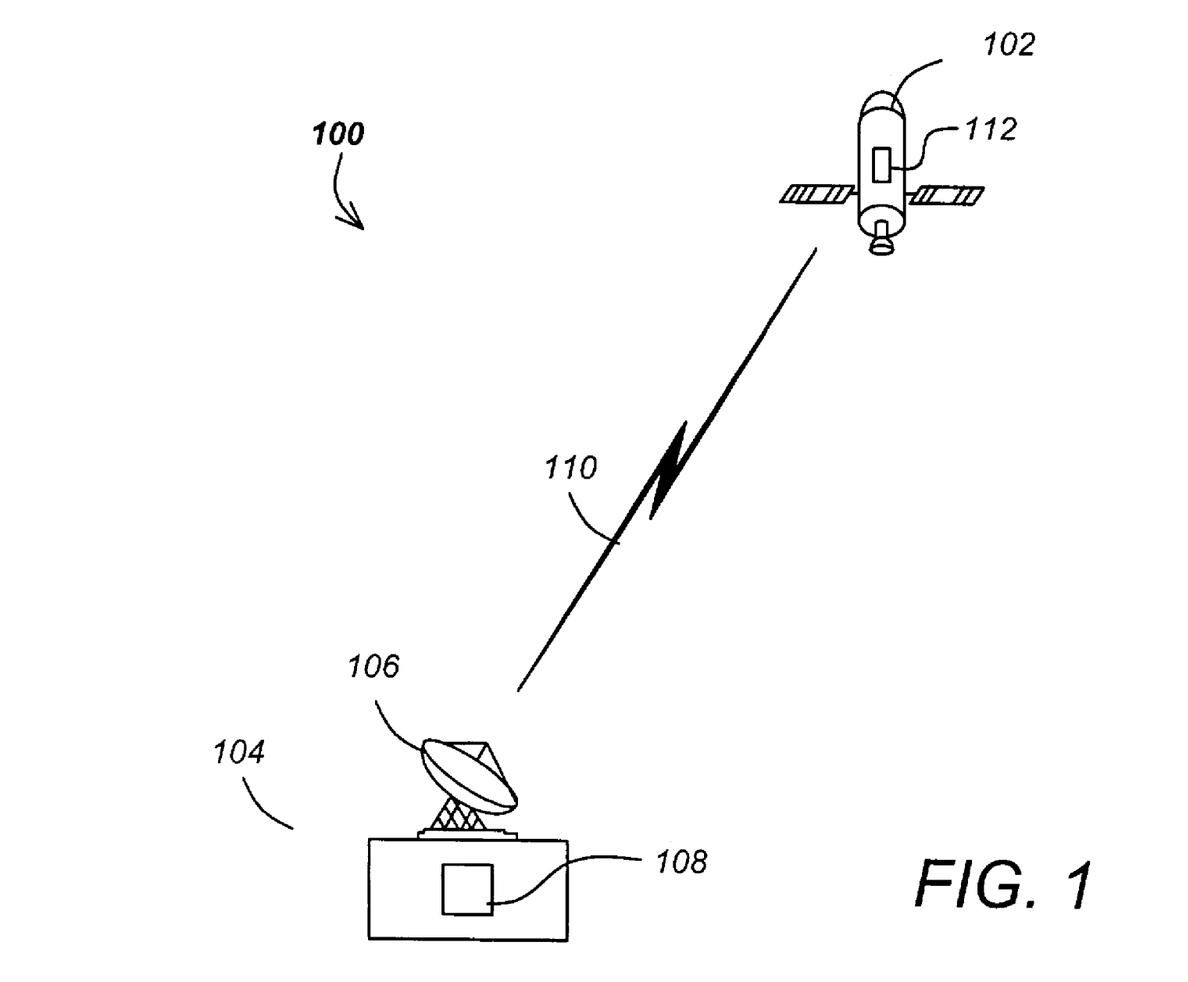
FIG. 1 is a block diagram showing an exemplary transmission system.

FIG. 1 is a diagram of a exemplary telemetry system 100 used to monitor satellite data. In this illustrative embodiment, a satellite 102 includes a telemetry transmission system 112 that collects data from satellite subsystems of interest, combines that data into a plurality of channels, and transmits a signal 110 with the channels of information to a telemetry ground system 104. Using antenna 106, the telemetry receiver 108 of the telemetry ground system 104 receives the signal, separates the signal into the plurality of channels, and provides the resulting data to external systems. In many implementations, the data comprises a series of constant period digital pulses of ones and zeros representing a serial data stream. Such signals are generated by a telemetry clock on the satellite 102, and must be replicated at the telemetry ground system 104 to recover the data. Typically, one of the channels of the signal 110 is dedicated to the transmission of a this telemetry clock.

In an idealized system, the telemetry system 100 would provide any number of desired channels, and each of the channels of information could be transmitted with infinite bandwidth. However, real systems offer neither infinite channel capacity or infinite bandwidth. In truth, both the number of available channels and the bandwidth available on each channel are typically limited, requiring the system designer to omit potentially useful information from the data stream. Further, as described above, real systems typically dedicate a channel to transmit a clock that is used to recover the data in the telemetry ground system, removing that channel for use to transmit data.

What is needed is a system that can transmit both the data clock and the data itself on a single channel. The present invention satisfies that need.

SUMMARY OF THE INVENTION

To address the requirements described above, the present invention discloses a method and apparatus for transcieving data and a clock on a single data stream. The method comprises the steps of receiving an encoded data stream, the encoded data stream is generated by encoding a data stream by a duty factor representing a value of the data in the data stream; and decoding the encoded data stream according to the duty factor of the encoded data stream. The apparatus comprises a receiver for receiving an encoded data stream, wherein the encoded data stream generated by encoding a data stream by a duty factor representing a value of the data in the data stream; and a decoder, communicatively coupled to the receiver, the decoder for decoding the encoded data stream according to the duty factor of the encoded data stream.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 2:
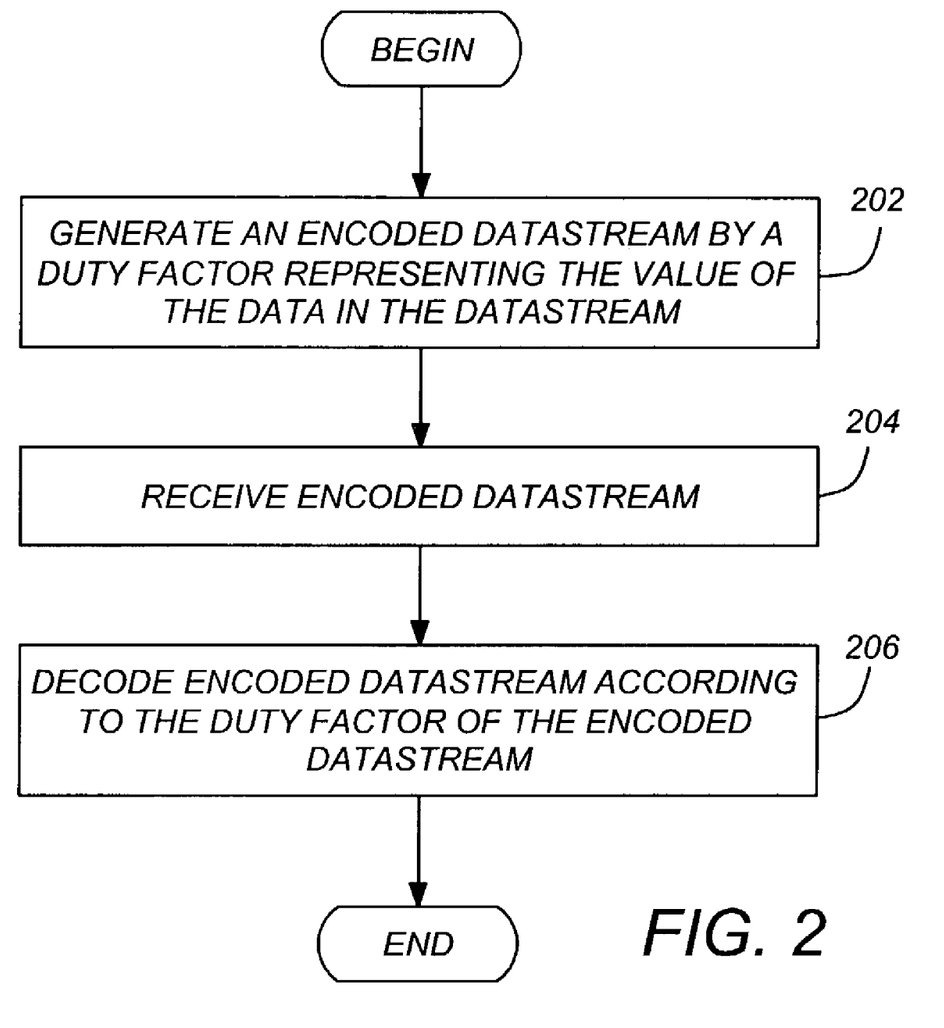
FIG. 2 is a flow chart presenting an illustrative example of process steps used in the transmission and reception of information.

FIG. 2 is a diagram showing exemplary process steps used to practice one embodiment of the invention.

Figure 3:
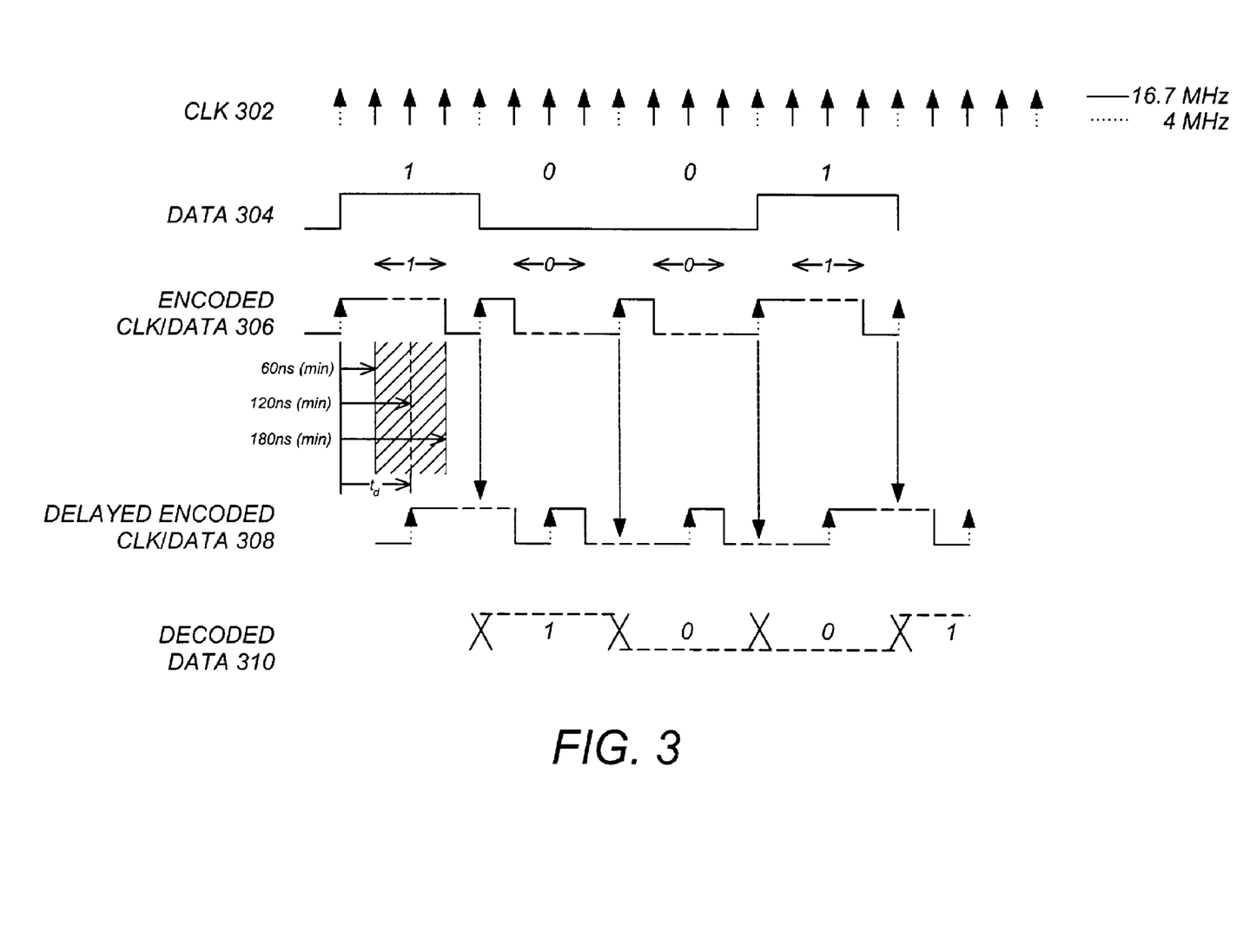
FIG. 3 is a timing diagram illustrating one embodiment of the decoding of the encoded data stream.

FIG. 3 is a diagram showing a timing diagram illustrating one embodiment of how the data stream is encoded and decoded. In this exemplary embodiment the clock signal 302 is a 16.7 MHz clock, with dotted pulses occurring at every fourth clock.

Referring now to both FIG. 2 and FIG. 3, an encoded data stream 306 is generated, as shown in block 202. The encoded data stream 306 is generated from a data stream 304 that is synchronized with a clock 302. The data stream 304 is encoded by a plurality of pulses having a duty factor representing a value of the data in the data stream 304. In the example illustrated in FIG. 3, the data stream 304 is encoded according to a 75% duty factor during the data interval (e.g. the time interval for which the data stream 304 is either a logical "1" or a logical "0") if the data stream 306 value is a logical "1", and encoded according to a 25% duty factor during the data interval if the data stream 306 value is a logical "0".

The encoded data stream 308 is then received, for example, by a telemetry ground system 104, as shown in block 204, and decoded, as shown in block 206.

Figure 4:
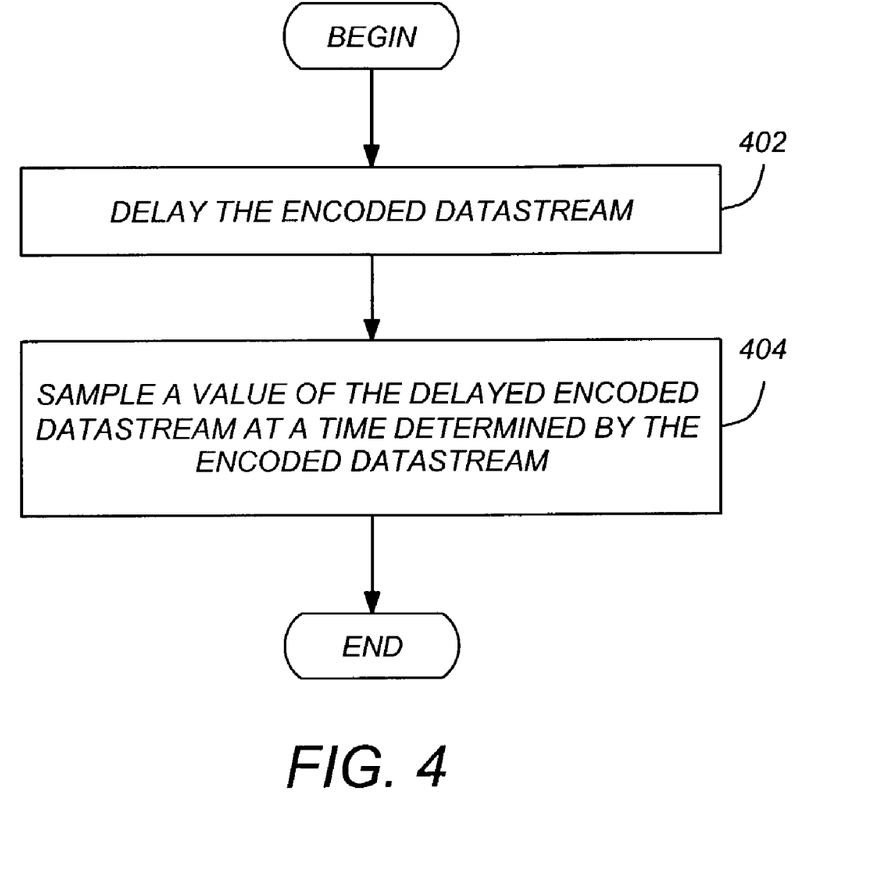
FIG. 4 is a diagram showing illustrative process steps used to decode an encoded data stream.

FIG. 4 is a flow chart presenting illustrative process steps that can be used to decode the encoded data stream.

Figure 5:
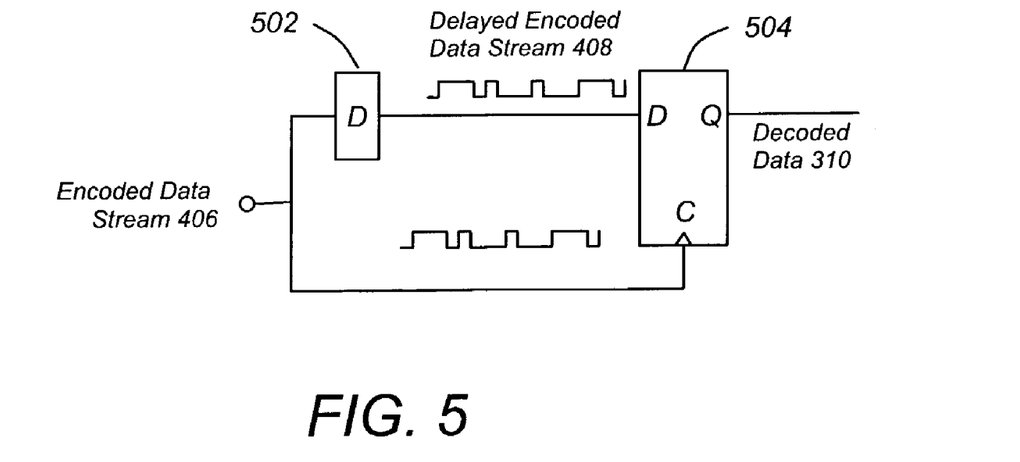
FIG. 5 is a diagram illustrating an exemplary circuit that can be used to decode the encoded data stream.

FIG. 5 is a diagram of an exemplary decoder 500 that can be used to implement that process steps described in FIG. 4.

Referring now to both FIG. 5 and FIG. 4, the encoded data stream 306 is delayed by a time $t_d$ and the value of the delayed encoded data stream 308 is sampled for a time period determined by the encoded data stream 308, as shown in blocks 402 and 404. In the embodiment shown in FIG. 5, the encoded data stream 306 is delayed by delay element 502 and provided to an input of a memory device 502 such as a "D-type" rising edge triggered flip-flop. The memory device 502 samples and temporarily stores the value of the delayed encoded data stream 308 for a time period coincident with the next rising edge of the encoded data stream 306, as determined from the dashed clock pulses 302 shown in FIG. 3. As shown in FIG. 3, the output of the memory device 502 is the decoded data 310, delayed by a time period $t_d$ comparable to the delay induced by the delay of step 402 and implemented by the delay element 502. In the illustrated example of wherein the clock frequency is 16.7 MHz and the duty cycles are 75% and 25%, respectively, to assure proper decoding, the time delay should between the minimum pulse width (60 nanoseconds) and the maximum pulse width (180 nanoseconds).

The present invention is not limited to the foregoing embodiments in which the data stream values are encoded according to a duty factor that is either 75% or 25%. For example, data stream logical values can be represented by duty factor pairs of 60%/40%, 70%/30%, 80%/20% or 90%/10%, as desired.

Figure 6:
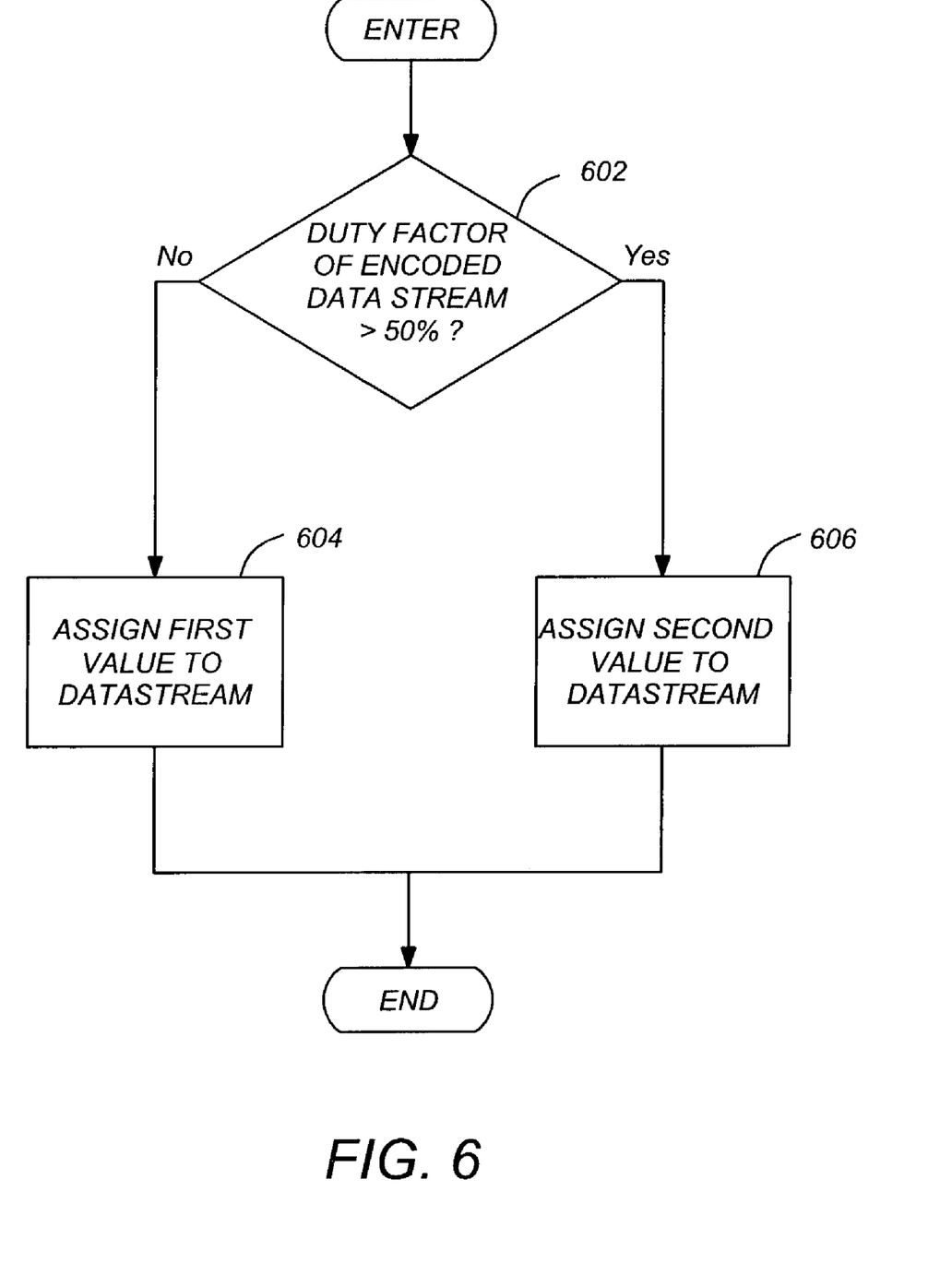
FIG. 6 is a diagram illustrating another embodiment of process steps used to decode the encoded data stream.

FIG. 6 is a flow chart presenting further exemplary process steps used to practice the present invention. In this embodiment, the encoded data stream 306 is examined to determine if the duty factor encoded thereon is greater than 50%. Depending on that comparison, a first or a second logical value are assigned to the data stream, as shown in blocks 604 and 606.

Note that the embodiment shown in FIGS. 3-5 indirectly determines whether the duty factor on the encoded data stream is greater or less than 50% by examining the value of the delayed data stream 308 at the appropriate time. However, the embodiment disclosed in FIGS. 3-5 relies on an examination of the delayed encoded data stream at one particular time, and can therefore be sensitive to delay element 502 variations from voltage variation, manufacturing variances and environmental factors such as temperature.

Figure 7:
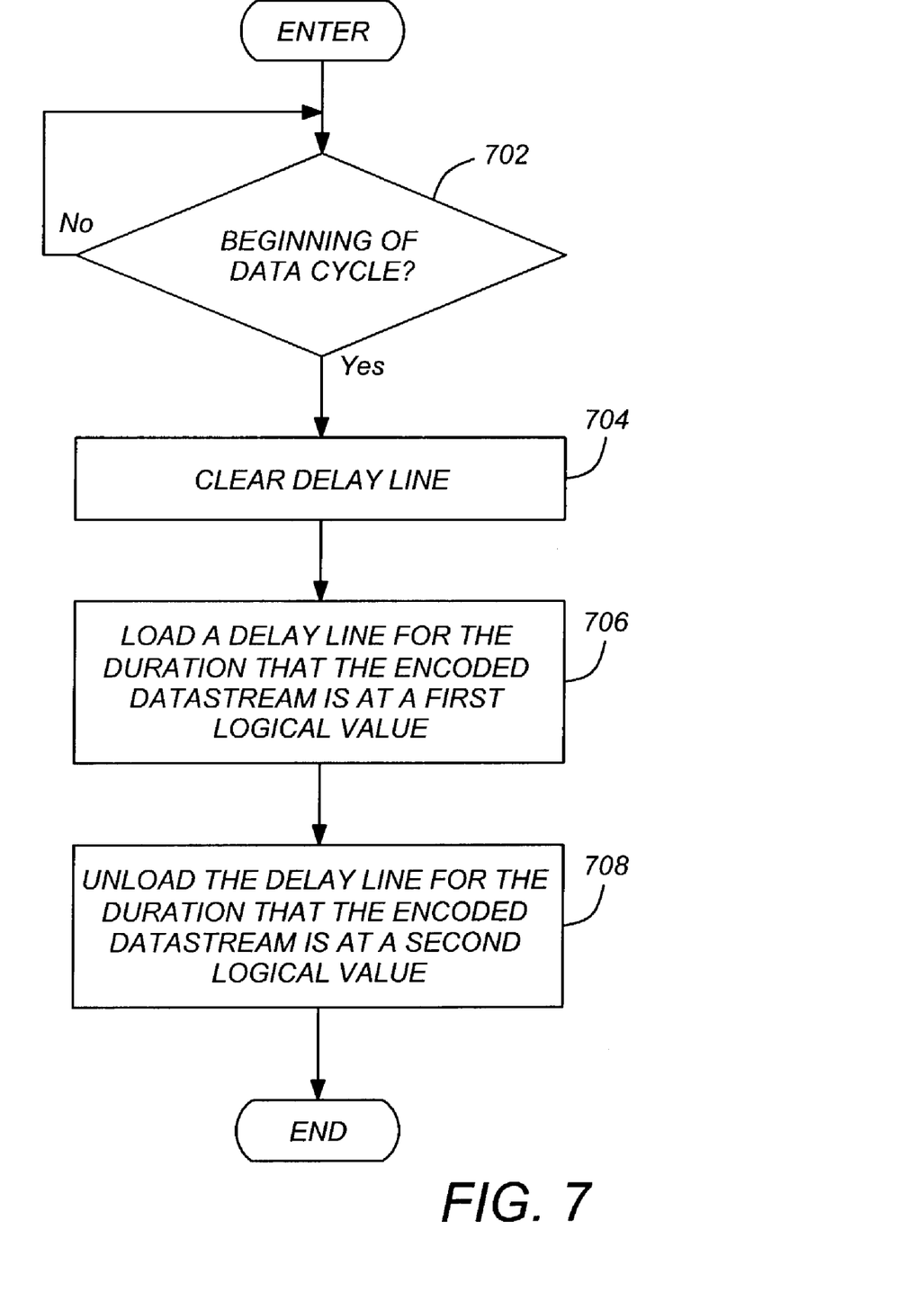
FIG. 7 is a diagram further illustrating another embodiment of process steps used to decode the encoded data stream.

FIG. 7 is a flow chart presenting exemplary process steps used to determine whether the encoded duty factor exceeds 50%. This embodiment directly determines the duty factor of the encoded data stream 306 and is not tightly coupled to the delay associated with the desired sampling point.

Figure 8:
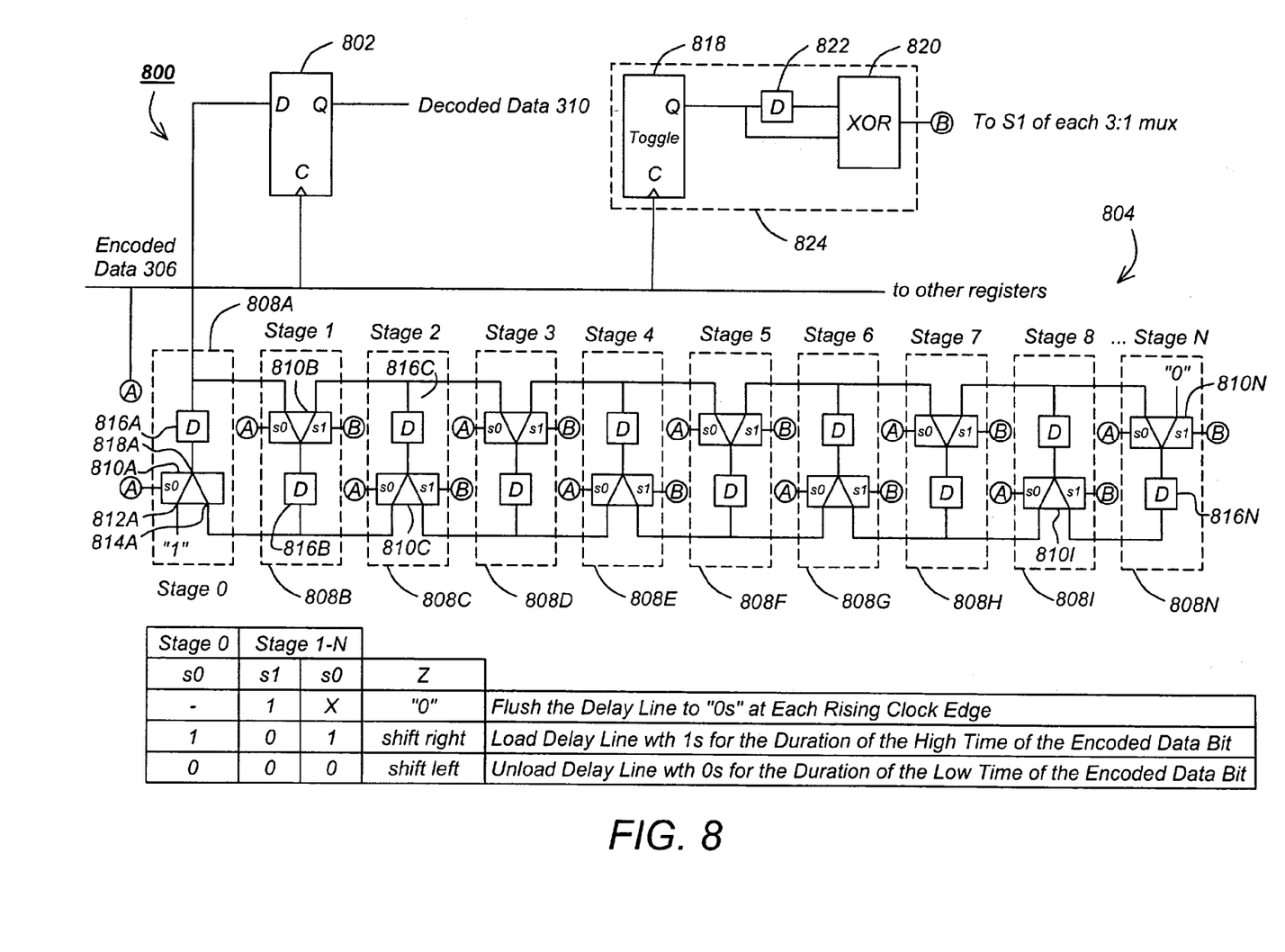
FIG. 8 is a diagram showing another embodiment of an exemplary circuit that can be used to decode the encoded data stream.

FIG. 8 is a diagram presenting a decoder 800 that can be used to implement the process steps illustrated in FIG. 7. The decoder 800 comprises memory device 802 such as a flip flop and a delay line 804. The delay line 804 comprises N+1 stages 808A-808N including a zero$^{th}$ stage 808A and an N$^{th}$ stage 808N. (The zero$^{th}$ to N$^{th}$ stages are also referred to herein as Stage i, where i=0, 1, ..., N. Further, for ease of notation, the elements in FIG. 8 will also hereinafter be referred to without the alphabetical suffix in cases where the description can apply to any or all of the elements. For example, stages 808A-808N will be collectively referred to as stages 808 or individually referred to as stage 808 where the description applies to any particular stage rather than a specific stage.)

Each stage 808 comprises a multiplexer 810 and a delay element 816. Each multiplexer 810 includes a first input 812, a second input 814 and an output 818. The value of the output 818 of each multiplexer 810 is selectable between the first input and the second input according to a control input s0. The output of each multiplexer 810 can also be cleared to zero via a second input s1.

A logical "1" is provided to an input 812A of the zero$^{th}$ stage multiplexer 810A, and a logical "0" is provided to an input to the N$^{th}$ stage multiplexer 810N. The output of the delay element 816A of stage 808A (i=0) is communicatively coupled to an input of the multiplexer 810A of the next stage (Stage 1) 808B. Similarly, the output of the delay element 816N is communicatively coupled to an input of multiplexer 810I of the preceding stage (Stage 8). With regard to the middle stages (stages i=1, 2, ..., N−1), the output of each delay element 816 of each Stage i 808 is provided to one of the inputs of the multiplexer 810 of the next succeeding [(i+1)$^{th}$] stage, and an input of the multiplexer 810 of the previous [(i−1)$^{th}$] stage 808.

Referring now to both FIGS. 7 and 8, block 702 checks to determine if the encoded data stream is at the beginning of a data cycle (e.g. the period during which the data stream 304 remains at a particular logical value). This can be performed, for example, by timing circuit 824. The timing circuit comprises a memory element 818 such as a flip flop, having an clock input and an output. The encoded data stream 306 is provided to the clock input of toggle flip-flop 818. At each rising clock edge, the output at Q of the toggle flip-flop 818 toggles between zero and one. The output of the memory element 818 is provided to an exclusive OR gate 820, both directly, and by an intervening delay element 822. The output of the exclusive OR gate 820 provides a logical "0" pulse that is used to clear (set to a logical "0") the delay elements of stages one through N at each rising clock edge. The zero$^{th}$ stage 808A of the delay line 804 will load the start of the next encoded data bit when the input transitions, and is independent from the XOR pulse.

Referring again to FIG. 7, when the beginning of a data cycle has been reached, each stage in a delay line 804 is cleared, as shown in blocks 702 and 704. Then, the delay line 804 is loaded for the duration that the encoded data stream 308 is at a first logical value. The delay line 804 is also unloaded for the duration that the encoded data stream is at a second logical value. This is illustrated in blocks 706 and 708.

With regard to the steps shown in blocks 702 and 708, each of the multiplexers 810 includes a first (s0) input which selects which input to the multiplexer 810 is provided to the output, and a second (s1) input which sets the output of the multiplexer to a logical "0" regardless of the value at the multiplexer's inputs. Each stage of the delay line 804 can therefore be cleared by setting the s1 value to a logical "1". The implementation of the steps shown in blocks 706 and 708 is described below.

When a logical "1" is provided to the s0 inputs of the multiplexers 810 of the delay line 804 and the s1 input is zero, the multiplexer 810A of the zero$^{th}$ stage 808A selects the first input 812A (to which a logical "1" has been provided), and thus, provides a logical "1" to the delay element 816A of the zero$^{th}$ stage 808A. With the next delay element time delay $t_d$, the output of the delay element 816 is provided to an input of the multiplexer 810B of the next stage (e.g. stage 1 808B).

If the next time delayed value from the encoded data stream 306 is also a logical "1" (e.g. s0 is logically high), the logical "1" present at the delay element 816A will be provided to the input of multiplexer 810B and thereby, to delay element 816B. Similarly, delay element 816A will be provided with another logical "1" as was the case in the previous sample.

Hence, as long as the encoded data stream 306 is at a logical "1", logical "1"s will be loaded into delay element 816A and any logical "1"s at the delay element 816 of each stage and propagated to the next succeeding stage 808.

Returning to the illustrative example (in which two $t_d$ intervals of logical "1" was provided to the delay line 804), if the next sample from the encoded data stream 306 is a logical "0", a logical "0" is presented to the s0 input of all of the multiplexers 810. Since a logical "0" is provided to the s0 input of the zero$^{th}$ stage 808A, multiplexer 810A selects the second multiplexer input 814A. Since this input 814A is coupled to the output of the delay element 816B of stage 1 808B (which, in the present example, is currently a logical "1"), a logical "1" is provided to the input of the delay 816 of the first stage. Also, the logical value at the output of the delay element 816C of the next stage, stage 2 808C (which, because all stages were cleared, and a logical "1" was never provided to this stage, is a logical "0") is provided to the multiplexer 816 of stage 1 808B.

Since the current sample from the encoded data stream 306 is a logical "0", a logical "0" is presented to the s0 input of the N$^{th}$ stage of the delay line 804, and the multiplexer 810N selects the multiplexer input coupled to the logical "0". Hence, the N$^{th}$ stage of the delay line 804 is loaded with a logical "0", that will be propagated to the preceding stages so long as the samples from the encoded data stream 306 remain at a logical "0".

Accordingly, it can be seen that successive logical "1"s are loaded into the stage 0 808A of the delay line 804, one at a time, and propagated into the following stages so long as the encoded data 306 is at a logical "1". Also, when the encoded data 306 is a logical "0", logical "0s" are loaded into the last stage 808N, and propagated toward the zero$^{th}$ stage 808A. Since the process begins with all of the stages having a logical "0", the result is that the output of stage zero 808 will be a logical "1", if the encoded data stream 306 is at a logical "1" longer than it is at a logical "0", and a logical "0" otherwise.

The delay line 804 therefore determines whether the duty factor of the encoded data stream is more or less than 50%.

This delay line 804 is advantageous in several respects. First, it is compatible with any clock frequency within a wide minimum/maximum range. The maximum clock frequency is determined by the granularity (delay time) of each of the delay elements 816 in the delay line 804, while the minimum clock frequency is determined by the total delay of the delay line 804. A delay line operating over a broad range of frequencies, therefore, could have a larger number of delay elements, each with a relatively short delay time. For example, an N stage design using delay elements with a delay time $t_d$ units of seconds would have a clock frequency range from a minimum of $$\frac{1}{2t_d} \text{ Hz}$$

Hz and a maximum of $$\frac{1}{2t_d N} \text{ Hz.}$$

For a time delay $t_d$ of 6.25 nanoseconds and N of 30 stages, this is approximately 2.7 MHz to 80 MHz. Conversely, the embodiment shown in FIG. 5 can only operate at about 4.1±1 MHz.

Second, the delay line 804 is less sensitive to timing variations, since the output is not directly coupled to the clock frequency, and since the bit sampling naturally adjusts to delay element $t_d$ variations resulting from temperature, voltage, process and other variations. Further, since the foregoing design is less sensitive to such variations, more efficient coding of the data stream 304 is possible. For example, data stream 304 may include encoding whereby a data value of "0" is represented by the data series "1000" and a data value of "1" is represented by a "1110" data series. Because the delay line 804 can automatically account for timing errors, a more bandwidth-efficient data coding scheme (e.g. where a data value of "0" is represented by the series "100" and a data value of " " is represented by a data series "110") can be used.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. Although the foregoing has been described with respect to a telemetry system and is particularly useful in such applications, it is broadly applicable to any system for the transmission and reception of signals from one location to another, including non-wireless systems. Further, while the foregoing illustrates embodiments in which the data stream includes only binary data (e.g. only a logical "1" or a logical "0"), the present invention is not limited to binary embodiments. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for receiving transmitted data, comprising:

a receiver for receiving an encoded data stream, the encoded data stream generated by encoding a data stream by a duty factor representing a value of the data in the data stream; and a decoder, communicatively coupled to the receiver, the decoder for decoding the encoded data stream according to the duty factor of the encoded data stream;

wherein the decoder comprises means for determining if the duty factor of the encoded data stream exceeds 50%;

means for assigning a first value to the data stream if the encoded data stream exceeds 50%; and means for assigning a second value to the data stream if the encoded data stream does not exceed 50%; and wherein the means for determining if the duty factor of the encoded data stream exceeds 50% comprises a delay line, comprising N+1 stages including a zero$^{th}$ stage and an N$^{th}$ stage, each stage comprising a multiplexer and a delay element, each multiplexer controlled by a first input s0 coupled to the encoded data stream and clearable by a second input s1;

wherein the multiplexer of the zero$^{th}$ stage is provided a high logical state input and the multiplexer of the N$^{th}$ stage is provided with a low logical state input;

wherein each delay element of each stage i =1, 2, ... N−1 is communicatively coupled to a multiplexer input of the (i+1)$^{th}$ stage and a multiplexer input of the (i−1)$^{th}$ stage;

a delay line output, communicatively coupled to an output of the delay element of the zero$^{th}$ stage; and a memory device having an input communicatively coupled to the delay line output and a clock input communicatively coupled to the encoded data.

2. The apparatus of claim 1, wherein the data stream is modulated at data frequency one fourth of a frequency of a clock.

3. The apparatus of claim 1, wherein the data stream is encoded by a duty factor of 75% for a first logical value of the data stream and 25% for a second logical value of the data stream.

4. The apparatus of claim 1, wherein the memory device is a flip-flop.

* * * * *